L. JOHNSON.
WINDMILL.
APPLICATION FILED OCT. 13, 1906.
905,538.
Patented Dec. 1, 1908.
6 SHEETS—SHEET 1.
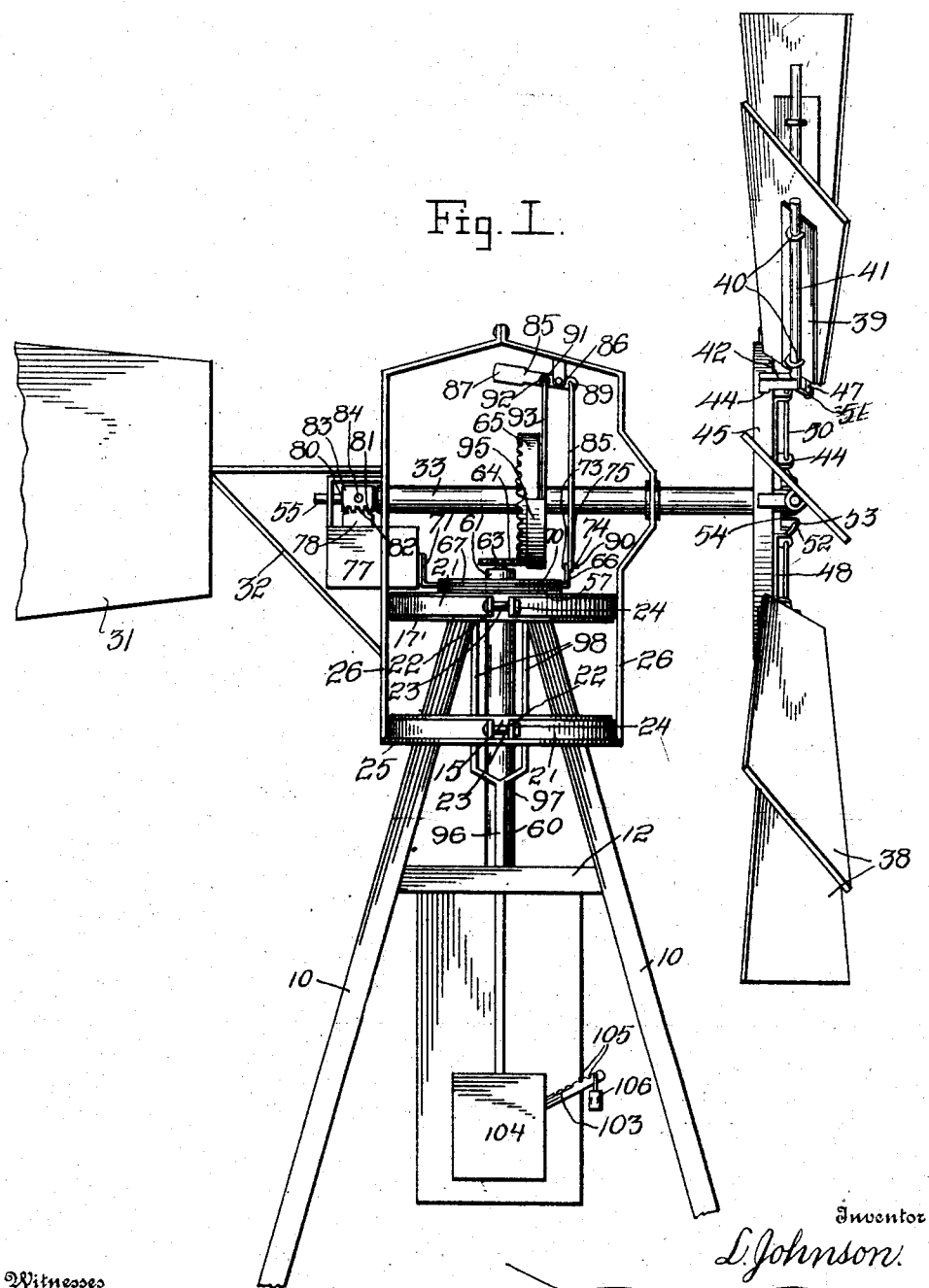
Fig. I.
Witnesses
Inventor
L. Johnson
By
Attorneys

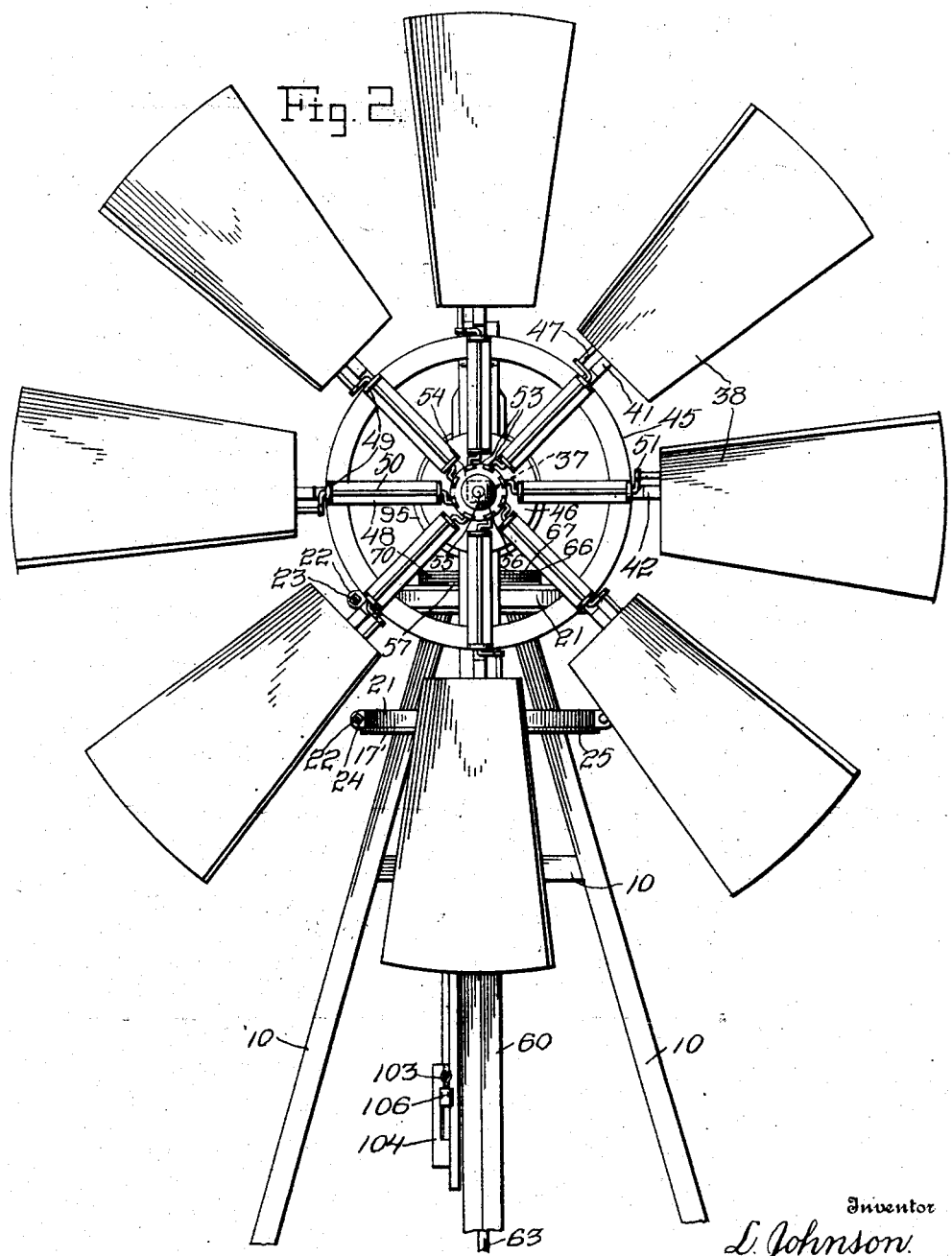

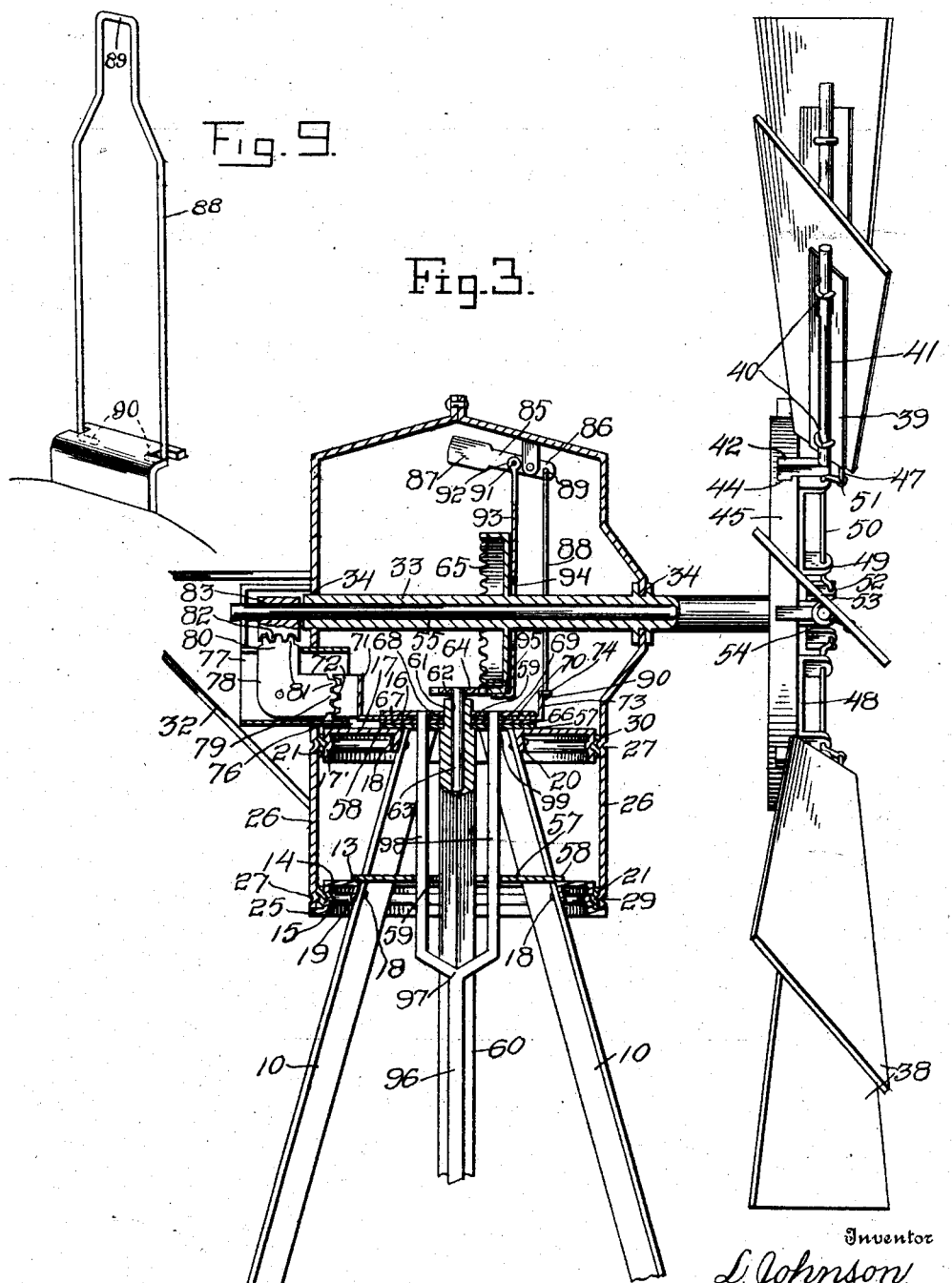

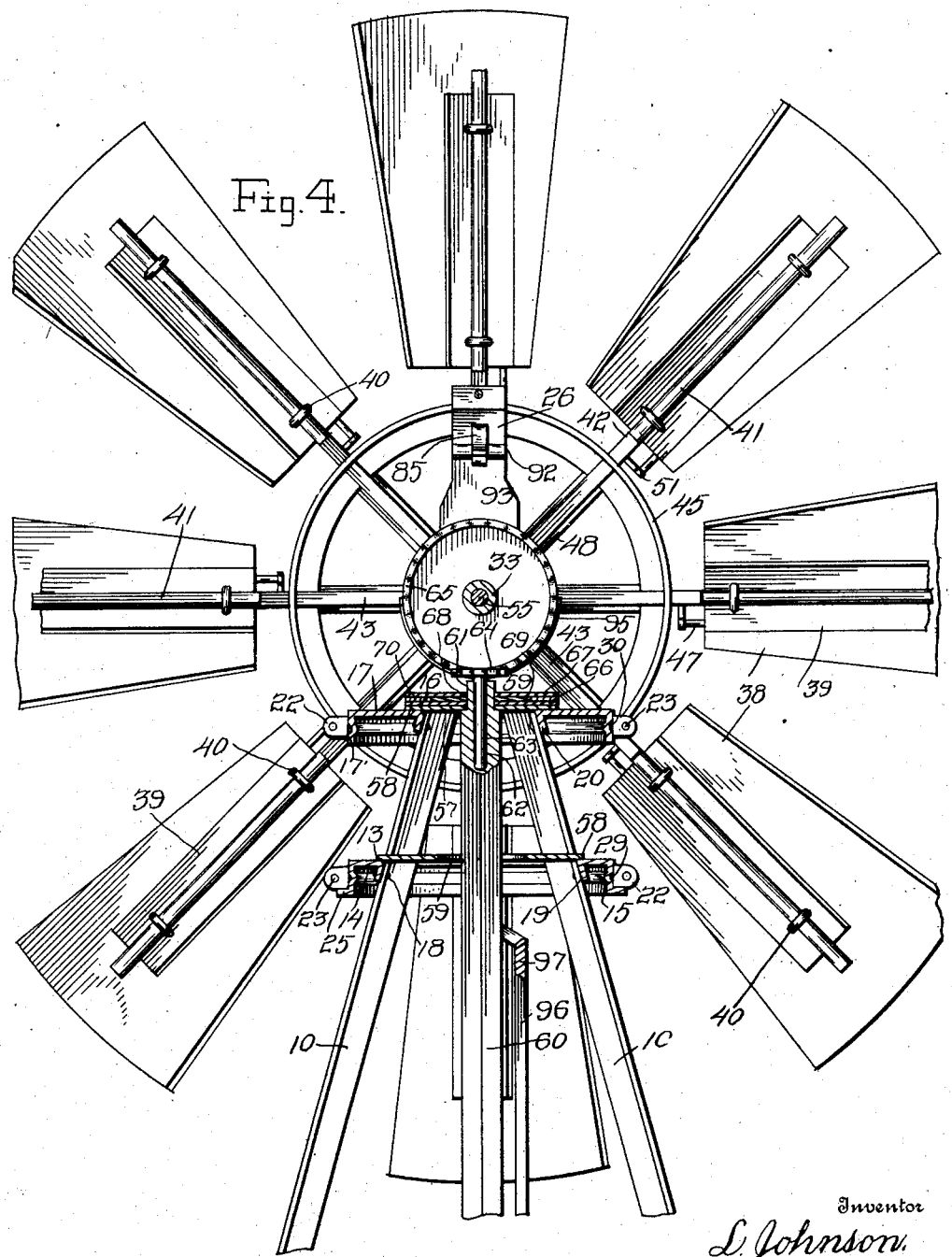

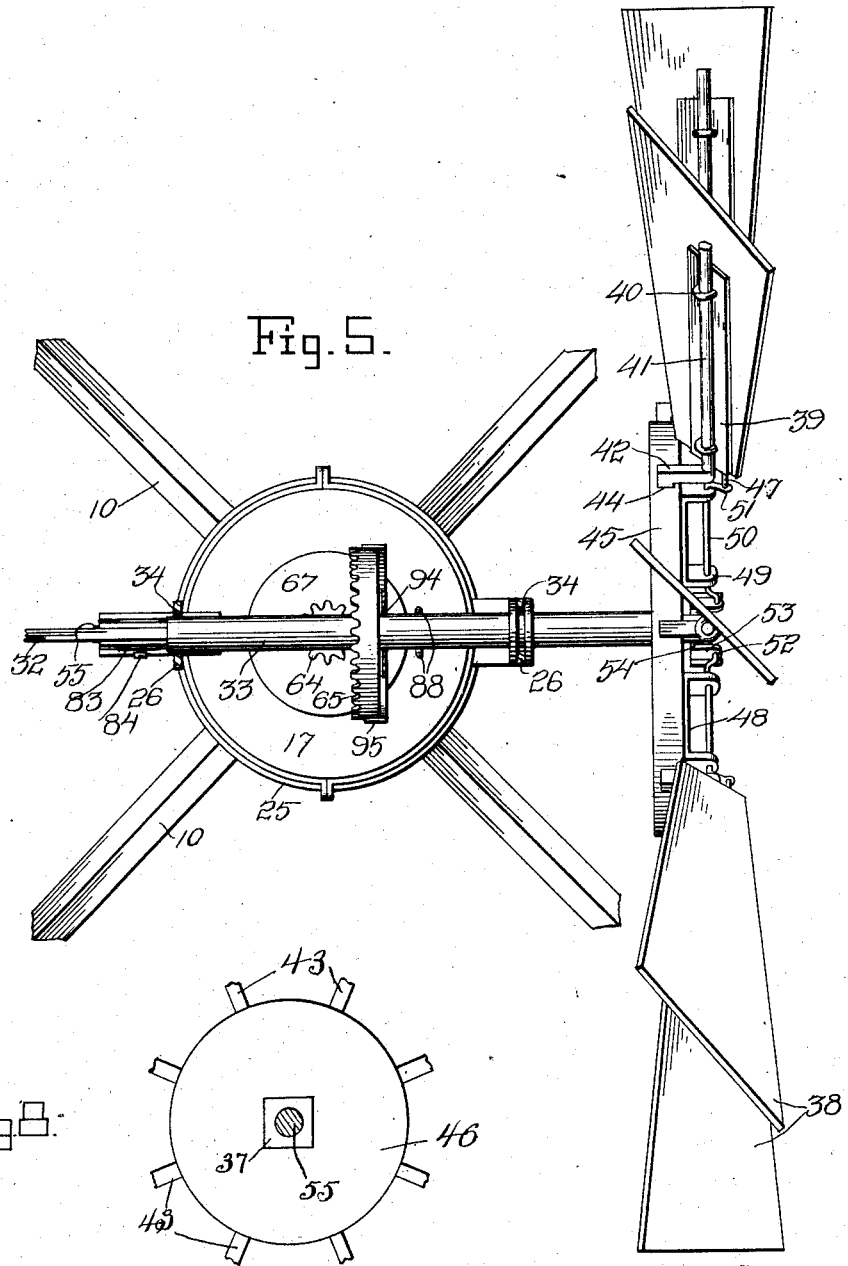

L. JOHNSON.
WINDMILL.
APPLICATION FILED OCT. 13, 1906.
905,538.
Patented Dec. 1, 1908.
6 SHEETS—SHEET 6.
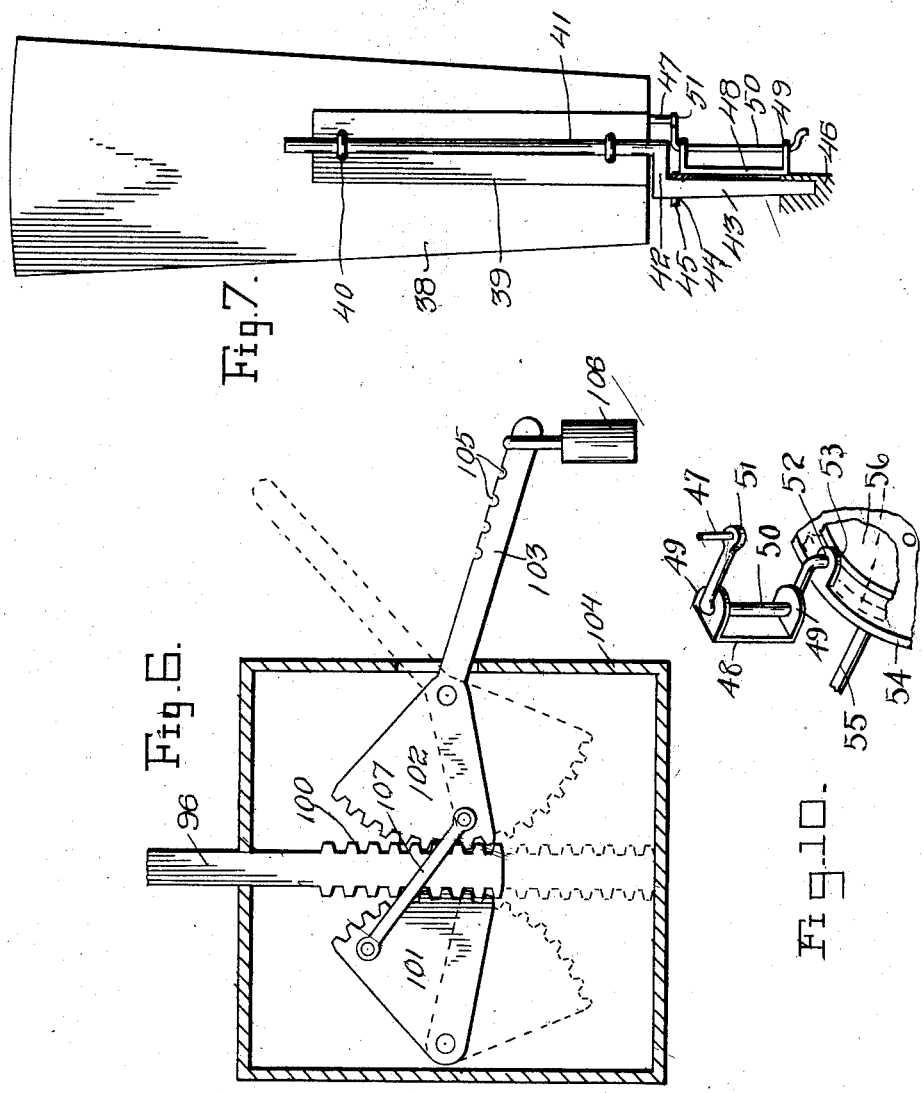

UNITED STATES PATENT OFFICE.

LOUIS JOHNSON, OF FESSENDEN, NORTH DAKOTA.

WINDMILL.

No. 905,538. Specification of Letters Patent. Patented Dec. 1, 1908.

Application filed October 13, 1906. Serial No. 338,753.

*To all whom it may concern:*

Be it known that I, LOUIS JOHNSON, a citizen of the United States, residing at Fessenden, in the county of Wells, State of North Dakota, have invented certain new and useful Improvements in Windmills; and I do hereby declare the following to be a full, clear, and exact description of the invention, such as will enable others skilled in the art to which it appertains to make and use the same.

This invention relates to windmills and the primary object of the invention is to provide a windmill having feathering blades and a novel mechanism for automatically regulating the power of the mill regardless of the amount of wind, the object of this arrangement being to permit working of the mill even in the strongest wind, when a small power is required.

The mechanism involving my invention is of such nature that it may be set to maintain a certain horse power and will automatically adapt itself to variations in the force of the wind to prevent deviation of the power upon the fixed degree.

Broadly speaking the invention resides in the provision of a windmill including feathering blades, actuated by the feathering of the plates to uprights or a bracket and hence regulate the speed of the rotation of the windmill shafts, and an adjusting device for controlling the regulating mechanism.

The common disadvantage found in mills of this class is that they require constant attention when there is a decided variation in the force of the wind and my invention therefore has for its object to entirely obviate this disadvantageous feature and produce a structure of this class which when once set for a certain degree of horse power, will automatically maintain that degree.

In the accompanying drawings:—Figure 1 is a view in side elevation of the mill. Fig. 2 is a front elevation of the same. Fig. 3 is a detail vertical longitudinal sectional view taken centrally through the upper portion of the mill. Fig. 4 is a similar vertical sectional view taken in plane at right angles to that of Fig. 3. Fig. 5 is a top plan view of a portion of the upper end of the windmill showing the regulating mechanism in top plan. Fig. 6 is a detail view in elevation of the adjusting device for the mill with the front of the casing of the same removed and showing in full lines the relative position of the parts when one limit of adjustment is obtained and in dotted lines the relative position of the other limit when adjustment is obtained, and Fig. 7 is a detail view in elevation of one of the blades for the windmill. Fig. 8 shows a broken detached detail of the shaft with its squared portion. Fig. 9 is an enlarged detached detail of the yoke as used in my invention, and Fig. 10 shows an enlarged detached broken detail of the spaced collars 56, as used in my invention.

Referring more specifically to the drawings the frame of the windmill is shown as comprising converging uprights 10 which are connected at their lower ends by means of the usual base beams (not shown) and adjacent their upper ends in pairs by means of the cross beams 12. The upper end portions of the uprights 10 are received in the corners of a rectangular opening 13 formed in a circular plate 14 having a depending annular flange 15 for a purpose to be hereinafter described, and the extreme upper ends of the said uprights are received in the corners of an opening 16 formed in a plate 17 which is also circular in form and provided with an annular flange 17' and which is located directly above but in spaced relation to the plate 14, and the said uprights are secured to the said plates 14 and 17 in the position stated by means of bolts 18 which are engaged through the said uprights and through flanges 19 and 20 formed integral with the plates 14 and 17 at the corners of the openings therein.

In order to adapt the plates 14 and 17 to support the framework upon which the mechanism of the windmill is mounted, collars are engaged around the flange portions of the said plates and each of said collars is composed of a pair of sections 21 which are provided at their ends with ears 22 which are apertured for the passage of oppositely threaded bolts 23 which bolts serve to connect corresponding ears of the sections formed in each part there being nuts 24 engaged upon each of the said bolts whereby the collar sections may be tightened upon the plates 14 and 17. The flange 15 of the plate 14 is provided at its lower edge with an annular rectangular flange 25 upon which the collar sections 21 for the said flange 15 rest, and the corresponding collar sections of each collar are connected by means of uprights 26 which uprights extend considerably above the upper collar and have their upper end portions bent inwardly toward each other and bolted together, the said uprights forming the frame for the support of the windmill mechanism.

In order that the frame and the collars which serve to support it, may turn to permit the plates forming the wheel of the windmill to be presented to the wind, a pocket 27 is stamped in each of the uprights 26 at its point of connection with the collar sections 21 and in annular grooves 29 and 30 formed in the flanges 15 and 17' respectively. The usual vane 31 is supported by means of a bracket 32 upon one of the uprights 26.

The numeral 33 denotes a tubular shaft which is journaled in suitable bearings 34 formed at corresponding points in the uprights 26 and that end of the said shaft opposite the end adjacent the vane 31 extends beyond its adjacent upright 26 and is squared at its end as at 37. The numeral 38 denotes the blades of the windmill wheel and 39 plates which are secured to the rear faces of the blades and each plate is provided at its ends with a pair of apertured ears 40 through which is engaged a rod 41 which is cranked as at 42 to form an arm 43. The rod 41 is engaged through the ears in such a manner that the blade may have a turning movement upon the rod and the arm 43 of which rod is squared and is engaged through one of a plurality of openings 44 formed in the rim 45 of the windmill wheel and the extreme end of each arm 43 is bolted or otherwise secured to the hub 46 of the wheel which hub is located concentric to the rim 45 and upon the squared portion 37 of the shaft 33. It will thus be seen that the arms 43 form substantial spokes for the windmill and are hence rigidly attached to the hub and rim of the wheel as above stated.

Each of the plates 39 is provided at its inner end with a pin 47 which is formed integral therewith and projects in the same direction as the arm 43. A bracket plate 48 is bolted or otherwise secured to that face of each of the arms 43 which is presented outwardly and in the direction of the pin 47 and the said plates extend between the wheel and the hub 46 thereof and have their ends bent forwardly at right angles as at 49 and provided with alining apertures in which crank shafts 50 are journaled. Each of the crank shafts 50 has one of its crank ends provided with an eye 51 in which the pin 47 upon the corresponding blade is engaged and has its opposite crank end extending in a slightly different plane and engaged in an opening 52 formed in a series of fingers 53 which are formed integral with and project forwardly from a collar 54 which is engaged upon a shaft 55 adjacent one end thereof and is held in this position by means of spaced collars 56 between which it is seated, said collars being arranged for rotation independently of the shaft. The shaft 55 is engaged through the bore of the shaft 33 and extends rearwardly beyond the rear end of the said shaft for a purpose to be presently fully explained.

A plate 57 is secured upon each of the plates 14 and 17 by means of bolts or other suitable fastening devices which are engaged through tongues 58 formed integral with the edges of the plate 57 and projecting between the uprights 10 of the frame of the windmill and through the openings 13 formed in the said plates 14 and 17. Each of the plates 57 is provided centrally with an opening 59. A squared shaft 60 is provided at its upper end with a cylindrical reduced portion 61 and is also provided with a bore 62 in which is journaled for rotation a shaft 63 which carries at its upper end a pinion 64 which is in mesh with a crown gear 65, which latter gear is secured upon the sleeve shaft 33 for rotation therewith, it being understood that when the said sleeve shaft is rotated through the action of the wind upon the blades 38, the shaft 63 will also be rotated and hence the shaft 63 forms the power shaft of the windmill mechanism. The opening 59 in the lower one of the plates 57 conforms to the transverse contour of the squared portion of the shaft 60 and is arranged for reception of the same and the opening 59 in the upper plate 57 is circular in form to receive the reduced cylindrical portion of the said shaft.

Disks 66 and 67 are provided centrally with circular openings 68 for the engagement therethrough of the reduced end 61 of the shaft 60 and secured between the disks 66 and 67 is a collar 69. The collar 69 is of less diameter than the disks between which it is secured and seated between the disks 66 and 67 and concentrically with respect to the collar 69 is a collar 70, the said collar being of such thickness that it may be readily rotated between the disks 66 and 67. Formed upon the outer periphery of the collar 70 is an upstanding lug 71 which is provided upon its rear face with a series of rack teeth 72 and formed upon the said outer periphery of the collar 70 but at a diametrically opposite point to the lug 71 is an upstanding tongue 73 which has its upper end portion bent at right angles as at 74 and the said right angular bent portion of the tongues is provided in each of the sides edges with notches 75 the purpose of which is to be hereinafter described.

A rectangular opening 76 is formed in the upright 26 upon which the bracket 32 is secured and in the said opening is secured a boxlike casing 77 into which the lug 72 projects and pivotally mounted between the side walls of the casing 77 for rocking movement thereof is a block 78 including right angularly directed portions 79 and 80 each of which is provided upon its end edge with a plurality of rack teeth 81, the rack teeth 81 upon the portions 79 being in mesh with the rack teeth 72 upon the lug 71 and the rack teeth 81 upon the portion 80 being in mesh with the rack teeth 82 formed upon the lower edge of a block 83, which is provided with a longitudinal bore whereby it may be slidably engaged upon the shaft 55, there being a set screw 84 engaged through one side of the said block 83 to hold it in various adjusted positions on the shaft 55.

From the foregoing it will readily be understood that when the disks 66 and 67 and the collar 70 are moved vertically, the block 78 will be oscillated through the instrumentality of the racked segments above described to shift the shaft 55 in the shaft 33 and consequently move the collar 54 thereby causing the oscillation of the crank shaft 50 upon the blades 38 to shift the blades and place them to a greater or less degree toward the wind. The rods 41 are located to one side of the longitudinal middle of the blades 38 and hence the exertion of the force of the wind upon the blades will be more upon one side than upon the other which will of course in a strong wind result in a turning of the blades to shift the shaft 55 and raise or lower the disks 66 and 67 and the collar 70.

Journaled for rocking movement upon the under side of the inwardly turned upper end portion of one of the uprights 26 is a lever 85 including a short arm 86 and a major weighted arm 87. A yoke including spaced portions 88 and a connecting portion 89 is engaged with its connecting portion through an opening formed in the short arm 86 of the lever 85 and the lower end of the spaced portions of the yoke are bent inwardly toward each other and at right angles as at 90 and the said inturned ends of the spaced portions are engaged in the notches 75 formed in the right angularly bent portion 74 of the tongue 73. Arms 91 project in opposite directions from opposite sides of the major weighted portion of the lever 85 and are engaged in spaced ears 92 formed at the upper end of a plate 93 which plate is provided adjacent its middle with a slot 94 through which is engaged the shaft 33 and the said plate 93 is provided at its lower edge with an integral arcuate brake flange 95 which is adapted at times to embrace the periphery of the crown gear 65 to brake the shaft 33.

From the foregoing it will be readily understood when the disks 66 and 67 and the collar 70 are lowered, the lever 85 will be oscillated to cause the brake flange 95 to contact with the periphery of the crown gear 65 to slacken the speed of the shaft when the disks are raised, the flange will be moved out of such contact and it will furthermore be obvious that in a strong gale the blades 38 will be so turned as to cause such braking of the shaft and as the wind slackens the brake will be released in the manner stated.

In order that the mechanism may be regulated to cause braking of the shaft to suit variations in the force of the wind, a forked rod 96 is provided at its upper end as at 97 to form spaced members 98 which have their upper ends secured in registering openings 99 formed in the disks 66 and 67 and the lower end of the rod 96 has its longitudinal edge of racked formation as indicated by the numeral 100 and seated between racked segments 101, and 102, the segments 102 being provided with an arm 103 which projects upwardly of the casing 104 in which the segments 101 and 102 are mounted and the said arm is provided in its upper edge with a plurality of notches 105 for the adjustable engagement thereupon of a weight 106 it being understood that more force will be required to raise the rod 96 when the weight is near the extreme outer end of the arm 93 than when it is near the inner end thereof. A rod 107 connects the racked segments 101 and 102 at their opposite sides and prevents binding of the segments during their movement.

What is claimed is—

1. In a wind mill, in combination, a sleeve shaft, a wind wheel carried by the sleeve shaft, blades shiftably mounted upon the wind wheel, a shaft journaled in the sleeve shaft, connections between the blades and the last named shaft, a brake wheel carried by the sleeve shaft, a brake band, and means whereby the brake band may be actuated by the shifting of the last named shaft.

2. In a wind mill, in combination a sleeve shaft, a wind wheel carried by the sleeve shaft, shiftable blades carried by the wind wheel, a shaft shiftably engaged through the sleeve shaft, crank connections between the said blades and said shiftable shaft whereby the latter may be shifted when the blades are shifted, a brake wheel carried by the sleeve shaft, a brake band, and connection between the brake band and the shiftable shaft whereby the shifting of the shaft will actuate the brake band.

3. In a wind mill, in combination, a sleeve shaft, a brake wheel carried by the shaft, a wind wheel carried by the shaft, shiftable blades carried by the wind wheel, a shiftable shaft engaged through the sleeve shaft, connections between the said blades and said shiftable shaft for shifting the latter when the blades are shifted, a brake band for the brake wheel, and means actuated by the shifting of the shiftable shaft for moving the brake band into engagement with the brake wheel.

4. In a wind mill, in combination a sleeve shaft, a wind wheel carried by the sleeve shaft, shiftable blades carried by the wind wheel, a brake wheel carried by the sleeve shaft, a shaft shiftably engaged in the sleeve shaft, crank connections between the blades and the shiftable shaft, a vertically movable member, means for moving the member actuated by the shifting of the shiftable shaft, a brake band disposed in position for engagement with the brake wheel, and connections between the vertically movable member and the brake band.

5. In a wind mill, in combination a sleeve shaft, a wind wheel carried by the sleeve shaft, shiftable blades carried by the wind wheel, a brake wheel carried by the sleeve shaft, a shaft shiftably engaged in the sleeve shaft, crank connections between the blades and the shiftable shaft, a vertically movable member, means for moving the member actuated by the shifting of the shiftable shaft, a brake band disposed in position for engagement with the brake wheel, connections between the vertically movable member and the brake band and means connected with the vertically movable member and regulating action of the same.

6. In a windmill, in combination, a sleeve shaft, a brake wheel carried by the shaft, a wind wheel carried by the shaft, shiftable blades carried by the wind wheel, a shiftable shaft engaged through the sleeve shaft, crank connections between the said blades and said shiftable shaft, a vertically movable member, means for moving the member, said means being actuated by the shifting of the shiftable shaft, a brake band for the brake wheel, connections between the brake band and the shiftable shaft for moving the brake band into engagement with the brake wheel when the shaft is shifted, and a weight actuated regulating device connected with the vertically movable member.

In testimony whereof, I affix my signature, in presence of two witnesses.

LOUIS JOHNSON.

Witnesses:
   W. S. Birch,
   C. I. Turner.